US010613415B2

(12) United States Patent
Santori et al.

(10) Patent No.: US 10,613,415 B2
(45) Date of Patent: Apr. 7, 2020

(54) OPTICAL LOGIC GATES

(71) Applicant: Hewlett Packard Enterprise Development LP, Houston, TX (US)

(72) Inventors: Charles M. Santori, Palo Alto, CA (US); Jason Pelc, Palo Alto, CA (US); Ranojoy Bose, Palo Alto, CA (US); Cheng Li, Palo Alto, CA (US); Raymond G. Beausoleil, Seattle, WA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/526,973

(22) Filed: Jul. 30, 2019

(65) Prior Publication Data

US 2019/0353981 A1    Nov. 21, 2019

Related U.S. Application Data

(62) Division of application No. 15/565,281, filed as application No. PCT/US2015/029813 on May 8, 2015, now Pat. No. 10,386,698.

(51) Int. Cl.
*G02F 3/00* (2006.01)
*G02F 1/35* (2006.01)
(Continued)

(52) U.S. Cl.
CPC .......... *G02F 3/00* (2013.01); *G02B 6/12004* (2013.01); *G02F 1/3515* (2013.01);
(Continued)

(58) Field of Classification Search
None
See application file for complete search history.

(56) References Cited

U.S. PATENT DOCUMENTS

| 5,475,704 A | 12/1995 | Lomashevich |
| 7,817,281 B2 | 10/2010 | Kiesel et al. |

(Continued)

FOREIGN PATENT DOCUMENTS

KR    10-2014-0035874 A    3/2014

OTHER PUBLICATIONS

Hideo Mabuchi., "Nonlinear Interferometry Approach to Photonic Sequential Logic," (Research Paper), Applied Physics Letters 99.15, Oct. 10, 2011, p. 153103, 4 pages.

(Continued)

*Primary Examiner* — Michael Stahl
(74) *Attorney, Agent, or Firm* — Hewlett Packard Enterprise Patent Department

(57) ABSTRACT

In the examples provided herein, an optical logic gate includes multiple couplers, where no more than two types of couplers are used in the optical logic gate, and further wherein the two types of couplers consist of: a 3-dB coupler and a weak coupler with a given transmission-to-reflection ratio. The optical logic gate also includes a first resonator, wherein the first resonator comprises a photonic crystal resonator or a nonlinear ring resonator, wherein in operation, the first resonator has a dedicated continuous wave input to bias a complex amplitude of a total field input to the first resonator such that the total field input is either above or below a nonlinear switching threshold of the first resonator, where the optical logic gate is an integrated photonic circuit.

4 Claims, 12 Drawing Sheets

(51) Int. Cl.
*G02F 3/02* (2006.01)
*G02B 6/12* (2006.01)

(52) U.S. Cl.
CPC ............ *G02F 1/3521* (2013.01); *G02F 3/024* (2013.01); *G02F 2203/15* (2013.01)

(56) References Cited

U.S. PATENT DOCUMENTS

| | | | |
|---|---|---|---|
| 8,155,531 | B2 | 4/2012 | Murthy et al. |
| 8,848,760 | B2 | 9/2014 | Vahala et al. |
| 10,386,698 | B2 * | 8/2019 | Santori .................... G02F 3/00 |
| 2003/0007719 | A1 | 1/2003 | Forrest et al. |
| 2010/0027104 | A1 | 2/2010 | Esener et al. |
| 2010/0053712 | A1 | 3/2010 | Carothers |
| 2010/0290749 | A1 | 11/2010 | Covey |
| 2011/0116735 | A1 | 5/2011 | Baets et al. |
| 2011/0293216 | A1 | 12/2011 | Lipson et al. |
| 2012/0039560 | A1 | 2/2012 | Mazur et al. |
| 2013/0243383 | A1 | 9/2013 | Agarwal et al. |
| 2014/0153601 | A1 | 6/2014 | Doerr et al. |

OTHER PUBLICATIONS

International Search Report & Written Opinion received in PCT Application No. PCT/US2015/029813, dated Apr. 22, 2016, 11 pages.

Santori, C. et al., "Quantum Noise in Large-Scale Coherent Nonlinear Photonic Circuits," Jun. 26, 2014, 14 pages.

Shi, W. et al., "Tunable Nanophotonic Delay Lines Using Linearly Chirped Contradirectional Couplers with Uniform Bragg Gratings," (Research Paper), Feb. 1, 2014, pp. 701-703.

* cited by examiner

Turn on a given external input to a given resonator and turn off other inputs to the integrated photonic circuit
1005

Sweep an amplitude of the given external input across a switching threshold of the given resonator
1010

Based on scattering from or light coupled out via a waveguide from the given resonator, set the amplitude of the given external input
1015

OPTICAL LOGIC GATES

STATEMENT OF GOVERNMENT INTEREST

This invention was made with government support under Contract No. N66001-12-2-4007, awarded by Defense Advanced Research Projects Agency. The government has certain rights in the invention.

BACKGROUND

Photonic integrated circuits are devices that have multiple optical components and, in some cases, electrical components, integrated on a substrate. Microfabrication techniques may be used to create components of the photonic circuits, such as optical waveguides and couplers, on the substrate.

BRIEF DESCRIPTION OF THE DRAWINGS

The accompanying drawings illustrate various examples of the principles described below. The examples and drawings are illustrative rather than limiting.

DETAILED DESCRIPTION

Figure 1:
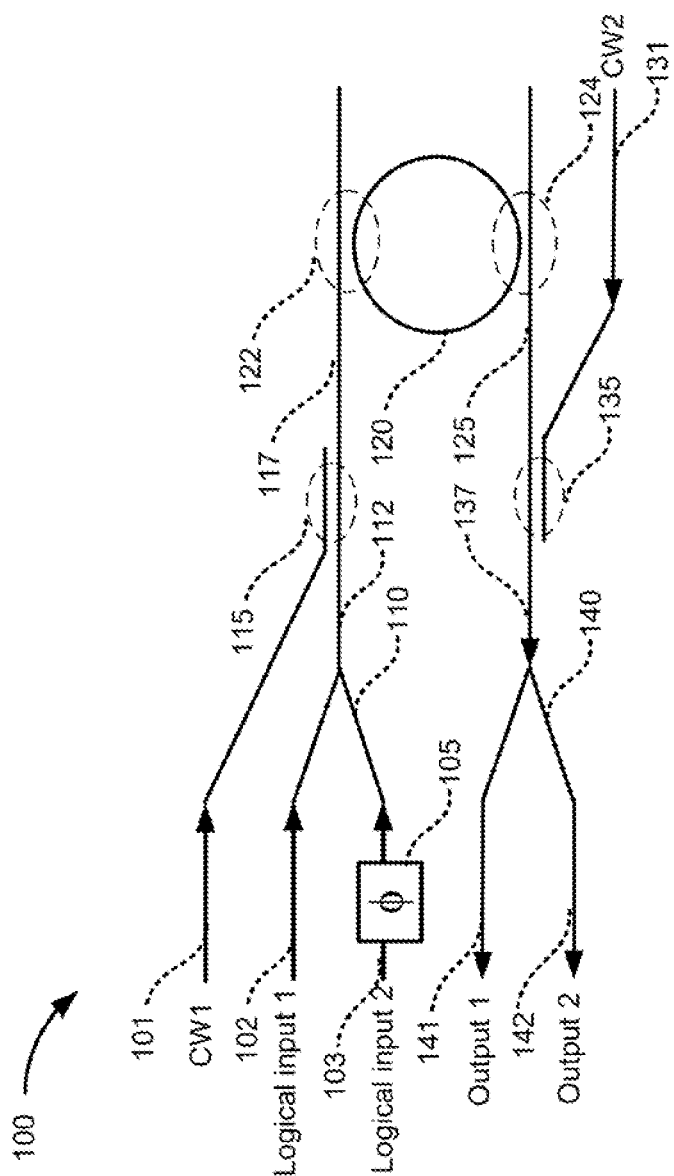
FIG. 1 depicts a schematic of an example photonic circuit that may function as an optical logic AND gate, an optical logic OR gate, an optical logic NAND gate, or an optical logic NOR gate.

Example photonic logic circuits are presented below that can tolerate large variations in component parameters and waveguide properties that may occur with microfabrication techniques. Further, methods for automatically tuning the photonic circuits are described that may compensate for dynamic fluctuations in the operating environment. The described photonic circuits are compatible with material systems used in integrated optics, including crystalline and amorphous silicon, silica-on-silicon, silicon nitride, gallium arsenide and other III-V materials, and hybrid (III-V on silicon) platforms.

The photonic circuits may be used in different configurations. For example, in some implementations, sources; detectors; nonlinear logic, memory, and routing; and electronics, such as used for tuning, may be on a single die. In other implementations, these elements may be in the same package, but some of the elements may be on different dies. For example, the sources and detectors may be on a first die, the nonlinear elements may be on a second die, and the electronics may be on a third die. The dies may be co-packaged using 2.5-dimensional (2.5D) or three-dimensional (3D) integration.

In yet other implementations, the nonlinear photonic elements may be positioned on-chip, while other elements such as the sources, detectors, and electronics may be external to the chip. This configuration is referred to in the description of the photonic circuits described below, although the photonic circuits may be used in any configuration. In the description, elements external to the chip on which the nonlinear photonic elements are located may be referred as being off-chip.

As described below, an optical logic gate may include multiple couplers, where no more than two types of couplers may be used in the optical logic gate, and further where the two types of couplers consist of: a 3-dB coupler and a weak coupler with a given transmission-to-reflection ratio. The optical logic gate may also include a first resonator, where the first resonator comprises a photonic crystal resonator or a nonlinear ring resonator. In operation, the first resonator has a dedicated continuous wave input to bias a complex amplitude of a total field input to the first resonator such that the total field input is either above or below a nonlinear switching threshold of the first resonator. The optical logic gate may be an integrated photonic circuit.

Also as described below, for the optical logic gate, whether it is an AND gate or an OR gate, the multiple couplers may include a 3-dB coupler having a first input port, a second input port, and an output port, and the 3-dB coupler to receive a first optical signal at the first input port and a second optical signal at the second input port. The optical logic gate may further include a tunable phase shifter to tune a phase shift of a signal at the second input port; and a first waveguide having an input end coupled to the output port of the 3-dB coupler, wherein the first waveguide is positioned near the first resonator to evanescently couple light in the first waveguide to the first resonator, where the multiple couplers further include a first weak coupler with the given transmission-to-reflection ratio to couple a first continuous wave to the first waveguide at a position between the 3-dB coupler and the first resonator. Further, the optical logic gate may include a second waveguide positioned near the first resonator to evanescently couple light out of the first resonator, where in operation, light propagating in the second waveguide is accessed as an output of the optical logic gate. The optical logic gate may function as an AND gate for the received first optical signal and the received second optical signal when an amplitude of the first continuous wave is within a first range, and the optical logic gate may function as an OR gate for the received first optical signal and the received second optical signal when the amplitude of the first continuous wave is within a second range, wherein the second range is greater than the first range. In some implementations, the multiple couplers may further include a second weak coupler with the given transmission-to-reflection ratio to couple a second continuous wave to the second waveguide, where in operation, the light propagating in the second waveguide includes the coupled second continuous wave, and the second continuous wave shifts an amplitude of the light coupled out of the first resonator.

Also as described below, when the optical logic gate performs an inverting or non-inverting fan-out function, the optical logic gate may include a first waveguide having an input end to receive a first optical signal, where the multiple couplers include a first weak coupler with the given transmission-to-reflection ratio to couple a first continuous wave to the first waveguide, and where the first waveguide is positioned near the first resonator to evanescently couple the first optical signal and the first continuous wave propagating in the first waveguide to the first resonator. The optical logic gate may also include a second waveguide positioned near the first resonator to evanescently couple light out of the first resonator, where the multiple couplers further include a 3-dB coupler having an input port and two output ports, and where the input port is coupled to an end of the second waveguide to receive light from the second waveguide, and further where the 3-dB coupler splits the light received at the input port into two separate output signals, one output signal at each of the two output ports. The optical logic gate may perform as an inverting fan-out circuit for the received first optical signal when the first continuous wave is 180 degrees out of phase with the first optical signal, and the optical logic gate may perform as a non-inverting fan-out circuit for the received first optical signal when the first continuous wave is in phase with the first optical signal. In some implementations, the multiple couplers may further include a second weak coupler with the given transmission-to-reflection ratio to couple a second continuous wave to the second waveguide, where the second continuous wave shifts an amplitude of the output signals.

Also as described below, when the optical logic gate performs a hybrid fan-out function, the optical logic gate may include a first waveguide having an input end to receive a first optical signal, where the multiple couplers include a first weak coupler with the given transmission-to-reflection ratio to couple a first continuous wave to the first waveguide, where the first waveguide is positioned near the first resonator to evanescently couple the first optical signal and the first continuous wave propagating in the first waveguide to the first resonator, and a second waveguide positioned near the first resonator to evanescently couple light out of the first resonator, wherein the multiple couplers further include a 3-dB coupler having an input port, a first output port, and a second output port, wherein the input port is coupled to an end of the second waveguide to receive light from the second waveguide, and further wherein the 3-dB coupler splits the light received at the input port into a first output signal at the first output port and a second output signal at the second output port. The optical logic gate may also include a third waveguide coupled to the first output port of the 3-dB coupler, and a fourth waveguide coupled to the second output port of the 3-dB coupler, wherein the multiple couplers further include a second weak coupler with the given transmission-to-reflection ratio to couple a second continuous wave to the third waveguide to generate a first logic gate output from the first output signal and the coupled second continuous wave; and a third weak with the given transmission-to-reflection ratio to couple a third continuous wave to the fourth waveguide to generate in operation a second logic gate output from the third output signal and the coupled second continuous wave. The second continuous wave may be selected such that the first logic gate output is a copy of the first optical signal. Additionally, the third continuous wave may be selected such that the second logic gate output is an inverted version of the first optical signal.

Also as described below, when the optical logic gate operates as a clocked flip-flop, the multiple couplers may include a first 3-dB coupler having a first input port, a second input port, and an output port, and the first 3-dB coupler to receive a first optical signal at the first input port and a clock optical signal at the second input port. The optical logic gate may further include a first waveguide having an input end coupled to the output port of the first 3-dB coupler, wherein the first waveguide is positioned near the first resonator to evanescently couple light in the first waveguide to the first resonator, wherein the multiple couplers further include a first weak coupler with the given transmission-to-reflection ratio to couple a first continuous wave to the first waveguide at a position between the first 3-dB coupler and the first resonator; and a second waveguide positioned near the first resonator to evanescently couple light out of the first resonator, wherein the multiple couplers further include a second 3-dB coupler having a first input port, a second input port, and an output port, wherein the first input port is coupled to an end of the second waveguide to receive light in the second waveguide, and the second input port to receive the clock optical signal. Additionally, the optical logic gate may include a third waveguide having an input end coupled to the output port of the second 3-dB coupler, wherein the multiple couplers further include a second weak coupler with the given transmission-to-reflection ratio to couple a second continuous wave to the third waveguide; a second resonator positioned near the third waveguide to evanescently couple light in the third waveguide to the second resonator; and a fourth waveguide positioned near the second resonator to evanescently couple light out of the second resonator, wherein the multiple couplers further include a third weak coupler with the given transmission-to-reflection ratio to couple a third continuous wave to the fourth waveguide to generate in operation a docked flip-flop output signal.

In the photonic circuits presented below, a few design constraints have been applied to make the circuits simpler to fabricate and simpler to tune so that they operate correctly. The constraints include: continuous wave (CW) and clock inputs are treated as external resources, for example, off-chip; each resonator has the same coupling parameters and nonlinearity; each resonator has a dedicated CW input that is used to bias it close to its bistability threshold; beam splitters are limited to two types: symmetric 3-dB couplers that may be implemented with Y-junctions, and weak couplers with a fixed transmission-to-reflection ratio for injecting CW and clock input signals, for example, from off-chip; and on-chip interferometer loops that do not serve a logic function are avoided.

Inputs may have tunable amplitudes and phases, for example, in some implementations, with off-chip inputs, a spatial light modulator may be used to control the amplitudes and phases, and fast signal modulation may be performed using acousto-optic or electro-optic modulators. In some implementations, there may be a single off-chip laser coupled to an on-chip waveguide. The signal may be split, for example, using a Y-junction coupler or multimode interference coupler, into two paths, a CW input path and a dock input path. The clock input path may be sent through an electrically driven amplitude modulator, such as a microring modulator or Mach-Zehnder interferometer modulator. Both the CW input path and the clock input path are then each further split with 3-dB couplers into many individual signals, with each signal in its own waveguide. Each waveguide may have its own electrically driven amplitude modulator, and its own electrically driven phase modulator to individually control its amplitude and phase. Alternatively, the circuit may use an on-chip laser, rather than an off-chip laser.

Additionally, while not shown explicitly in the figures below, coupling devices, such as grating couplers, tapered waveguides, or abruptly terminating waveguides, may be used to bring off-chip signals into the input waveguides of the photonic circuits. Similarly, output signals from the photonic circuits may be brought off-chip using elements such as grating couplers, tapered waveguides, or abruptly terminating waveguides. Alternatively, unused outputs from the photonic circuits may be discarded, for example, by using tapered waveguides to avoid back-reflections.

FIG. 1 depicts a schematic of an example photonic circuit 100 that may function as an AND gate, an OR gate, a NAND gate, or a NOR gate. The solid lines in the photonic circuit 100 represent optical waveguides, for example, a silicon or silicon nitride waveguide situated on a silicon dioxide cladding layer. The circle 120 in FIG. 1 may represent a resonator, such as a nonlinear ring resonator or a photonic crystal resonator.

A nonlinear ring resonator is a waveguide formed in a closed loop. The ring resonator may have a dedicated continuous wave input to bias a complex amplitude of a total field input to the ring resonator such that the total field input is near, either above or below, a nonlinear switching threshold of the ring resonator.

Photonic crystals are periodic nanostructures that affect the propagation of electromagnetic waves inside the structure. A photonic crystal resonator may be designed to support a resonant optical mode. In some cases, the photonic crystal resonator may support bidirectional resonant modes. In some cases, additional elements may be used in conjunction with the photonic crystal resonator to create desired directional modes in the resonator. For concreteness, the following examples of photonic circuits are described using nonlinear ring resonators, however, photonic crystal resonators may also be used in photonic circuits in the location of the ring resonators described below.

In the example of FIG. 1, small gaps between waveguides, indicated within dotted ovals 115, 135, or between a waveguide and the ring resonator 120, indicated within dotted ovals 122, 124, are evanescent coupling regions. For example, light may be evanescently coupled from bus waveguide 117 to the resonator 120 via the coupling region 122 when the bus waveguide 117 is positioned close to the resonator 120, and similarly, light may be evanescently coupled out of the resonator 120 to drop waveguide 125 via the coupling region 124. As another example, coupling regions 115, 135 may each represent, for example, a weak coupler with a given transmission-to-reflection ratio. Thus, weak coupler 115 may couple a portion of light in input waveguide 101 and a portion of light in waveguide 112 into bus waveguide 117. Similarly, weak coupler 135 may couple a portion of light in waveguide 131 and a portion of light in drop waveguide 125 into waveguide 137.

The photonic circuit 100 may receive a continuous wave (CW) input at waveguide 101 and two logical inputs at waveguides 102, 103, respectively. The photonic circuit 100 may provide two identical outputs, one on each of output waveguides 141, 142. When the photonic circuit 100 operates as a logical AND gate, the outputs at waveguides 141, 142 are high when both of the logical inputs at waveguides 102 and 103 are high; otherwise, the outputs are low. When the photonic circuit 100 operates as a logical OR gate, outputs at waveguides 141, 142 are high when either or both of the logical inputs at waveguides 102, 103 are high; otherwise, the outputs are low.

A 3-dB coupler 110, for example, a Y-junction coupler, may be used to couple the signals in the two input waveguides 102, 103 to an intermediate waveguide 112. The 3-dB coupler 110 may operate as a beam splitter where half of the input signal from each of the input waveguides 102, 103 are coupled to intermediate waveguide 112. As described above, weak coupler 115 may couple a portion of the CW input light in waveguide 101 and a portion of the two logical inputs in waveguide 112 into bus waveguide 117.

The resonant wavelength of the resonator 120 may be tuned by changing the effective refractive index of the waveguide of the resonator 120. At resonant wavelengths of the resonator 120, light from bus waveguide 117 develops as a traveling wave in the resonator 120. However, light propagating at non-resonant wavelengths in bus waveguide 117 continues to propagate in bus waveguide 117 with little to no coupling effect to the resonator 120.

The linewidth of the resonance is dependent upon the width of the gap between the bus waveguide 117 and the resonator 120, which determines coupling strength. The linewidth also depends on the strength of the absorption or scattering loss in the resonator 120.

For light at and near a resonance of the resonator 120 propagating in the bus waveguide 117, the energy density may build up inside the resonator 120, such that the energy density within the resonator 120 is greater than within the bus waveguide 117. Because switching of the logic gate is dependent upon nonlinear effects in the material of the resonator 120, the greater the energy density, the stronger the nonlinear effects.

Figure 2A:
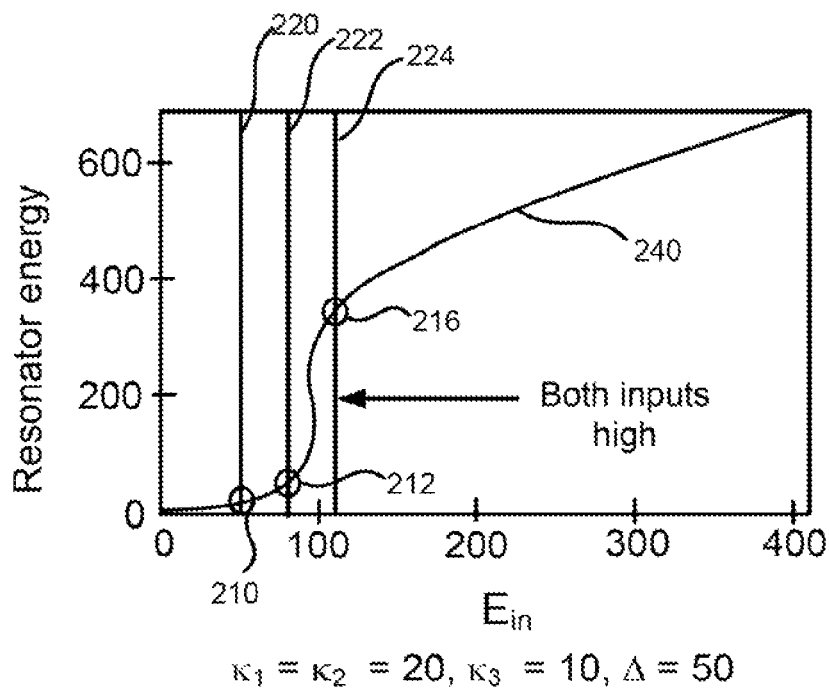
FIG. 2A depicts a graph of resonator energy in an example resonator in an optical logic AND gate as a function of drive electric field.

The CW input CW1 received at waveguide 101 may be used to bias the resonator 120 close to its bistability threshold. FIG. 2A shows a graph of resonator energy in an example resonator 120 in a optical logic AND gate as a function of the drive electric field in the bus waveguide 117.

Parameters (in normalized frequency units) for the resonator 120 used to obtain the graph in FIG. 2A are: $K_1=20$, where $K_1$ is the coupling strength between the bus waveguide 117 and the resonator 120; $K_2=20$, where $K_2$ is the coupling strength between the drop waveguide 125 and the resonator 120; $K_3=10$, where $K_3$ is the coupling strength of the resonator 120 to free space modes, representing undesired loss of energy out of the resonator 120; and $\Delta=50$, where $\Delta$ is the initial detuning between the inputs and the frequency of the resonance of the resonator 120. Curve 240 shows that the resonator 120 exhibits a switching threshold between drive field levels 222, 224. This switching threshold arises because initially, for example, at drive field level 220, with the detuning, the inputs are off-resonance and a small amount of light, as indicated by point 210, couples into the resonator 120 from the bus waveguide 117. However, an increase in the CW input increases the drive field to, for example, drive level 222, and sufficient light couples into the resonator 120, as indicated by point 212, so that the nonlinear Kerr effect pulls the resonator 120 into resonance with the drive field. As a result, with a further small increase in drive field to, for example, drive level 224, a jump in the amount of light coupled into the resonator 120 occurs, as indicated by point 216.

Effects similar to the non-linear Kerr effect may be obtained using carrier-based nonlinearities. Carrier-based nonlinearities may operate on a slower timescale than the Kerr nonlinearity, ranging from a few picoseconds to a few nanoseconds, depending on the material and processing. Further, the nonlinear index shift may have the opposite sign for carrier-based nonlinearities, as compared with the Kerr nonlinearity, so the detuning Δ also has the opposite sign.

Additionally, effects similar to the non-linear Kerr effect may be obtained using thermal nonlinearities. Thermal nonlinearities have the slowest time constants, for example 15 ns in some amorphous-silicon ring devices. However, in many devices, thermal nonlinearities may be dominant over longer timescales.

The CW input should remain on and constant independent of the logical inputs to waveguides 102, 103. For the case where the photonic circuit 100 is designed to operate as an AND gate, the CW input may be selected such that if both inputs to the waveguides 102, 103 are low or off, the total drive is at a non-zero level, as indicated, for example, by drive level 220 in FIG. 2A, where the resonator 120 operates below threshold. If a single one of the logical inputs is on or high, the total drive input moves closer to the threshold, as indicated, for example, by drive level 222. When both logical inputs are on or high, the threshold is exceeded, as indicated, for example, by drive level 224, where a large amount of light may be coupled into the resonator 120 from the bus waveguide 117.

Returning to FIG. 1, light is coupled out of the resonator 120 at the coupling region 124 to drop waveguide 125. In some implementations, a second CW input CW2 may be coupled to the drop waveguide 125 via a second weak coupler 135. To make the fabrication of the photonic circuit simpler, the transmission-to-reflection ratio of the second weak coupler 135 may be the same as that of weak coupler 115. The second CW input CW2 may be used to cancel, through destructive interference, the residual resonator output that occurs for a logical input that is low. As a result, the level of the outputs on waveguides 141, 142 are shifted closer to zero when the logic gate is in the off state. However, in some implementations, the second CW input and the second weak coupler 135 may not be used, resulting in off states that are above zero.

Coupled to the output of the weak coupler 135 is waveguide 137. In implementations where the second weak coupler 135 is not used, waveguide 137 is the same as drop waveguide 125. A second 3-dB coupler 140 is used to split the signal in waveguide 137 into two output waveguides 141, 142, and the signal carried by the two output waveguides 141, 142 are the outputs of photonic circuit 100.

One of the input waveguides 102, 103 may include a phase shifter. In the example of FIG. 1, phase shifter 105 is shown coupled to input waveguide 103, although the phase shifter 105 may alternatively be coupled to input waveguide 102. The phase shifter 105 may be useful when multiple inputs to the photonic circuit 100 originate from on-chip, and an uncontrolled phase shift arises in the photonic circuit 100 from the lithography process used to create the photonic circuit 100. To control an optical phase that originates from light traveling in the waveguide, the propagation distances may need to be within 10 nm, which is difficult to control with lithography techniques. Thus, the phase shifter 105 may be used to compensate for the uncontrolled phase shift. In one example, the phase shifter 105 may include a length of waveguide wrapped around a core with a heater that causes the refractive index of the waveguide to change when heated, thus varying the phase shift. In another example, the phase shifter 105 may include an overcoupled ring resonator that is tuned based on the desired phase shift.

Figure 2B:
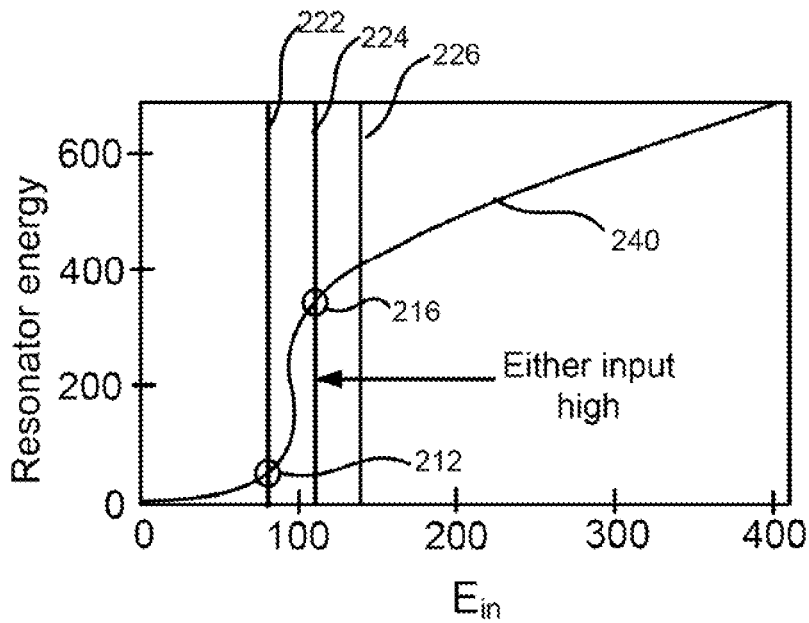
FIG. 2B depicts a graph of resonator energy in an example resonator in an optical logic OR gate as a function of drive electric field.

The photonic circuit 100 of FIG. 1 may be operated as an OR gate, instead of an AND gate, by selecting the CW input level appropriately. FIG. 2B shows a graph of resonator energy in an example resonator 120 in an optical logic OR gate as a function of the drive electric field in the bus waveguide 117. As with the AND gate described above with respect to FIG. 2A, the parameters for the resonator 120 used to obtain the graph in FIG. 2B are the same. However, for operation as an OR gate, curve 250 in FIG. 2B shows that the CW input may be selected such that if both inputs to the waveguides 102, 103 are low or off, the total drive is at a low, non-zero level, as indicated, for example, by drive level 222 in FIG. 2B, where the resonator 120 operates below threshold at point 212. In comparison to operation as an AND gate, the CW input for the OR gate is higher. If a single one of the logical inputs is on or high, the total drive input exceeds the threshold, as indicated by, for example, drive level 224 and point 216, where a large amount of light is coupled into the resonator 120 from the bus waveguide 117. Thus, the resonator 120 switches states when a single logical input is on or high, as expected with an OR gate. When both logical inputs are on or high, the threshold remains exceeded, as indicated, for example, by drive level 226.

Figure 3:
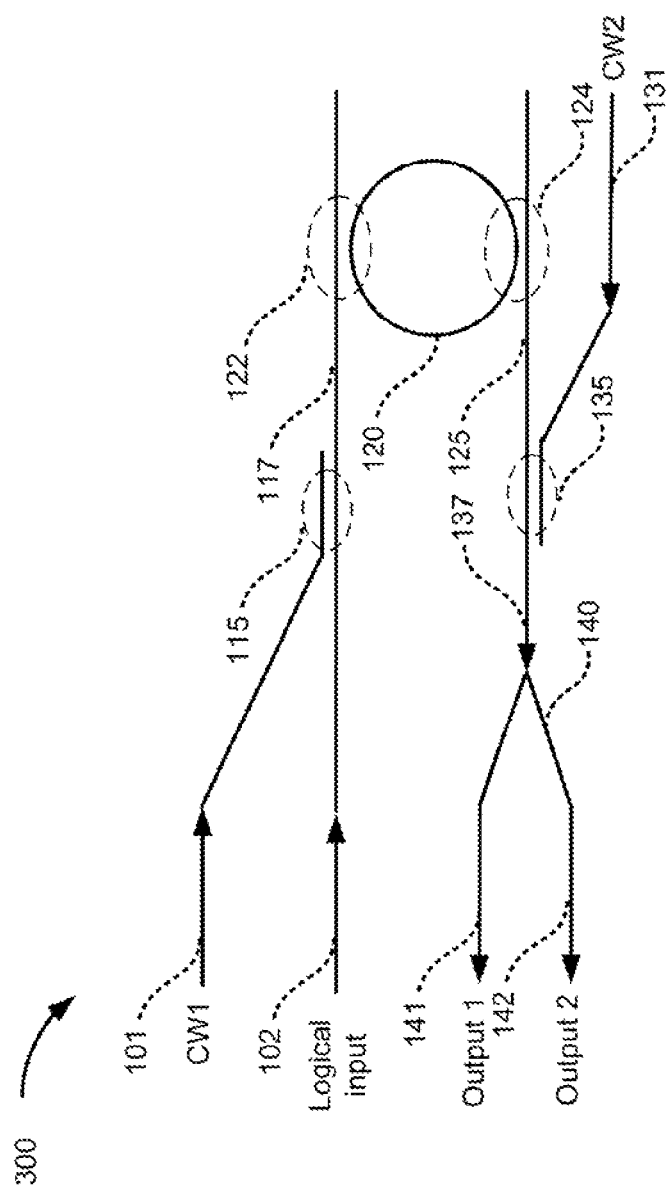
FIG. 3 depicts a schematic of an example photonic circuit that may perform an inverting fan-out or a non-inverting fan-out.

FIG. 3 depicts a schematic of an example photonic circuit 300 that may perform an inverting fan-out or a non-inverting fan-out function for a logical input. Photonic circuit 300 is similar to photonic circuit 100 depicted in FIG. 1, except photonic circuit 300 accepts a single logical input (carried by waveguide 102), rather than two logical inputs as with photonic circuit 100. Similar to photonic circuit 100, photonic circuit 300 accepts a CW input CW1 at waveguide 101 that biases resonator 120 close to its bistability threshold. The parameters for the resonator 120 in photonic circuit 300 are the same as those of the resonator used to obtain the graphs in FIGS. 2A and 2B.

Figure 4A:
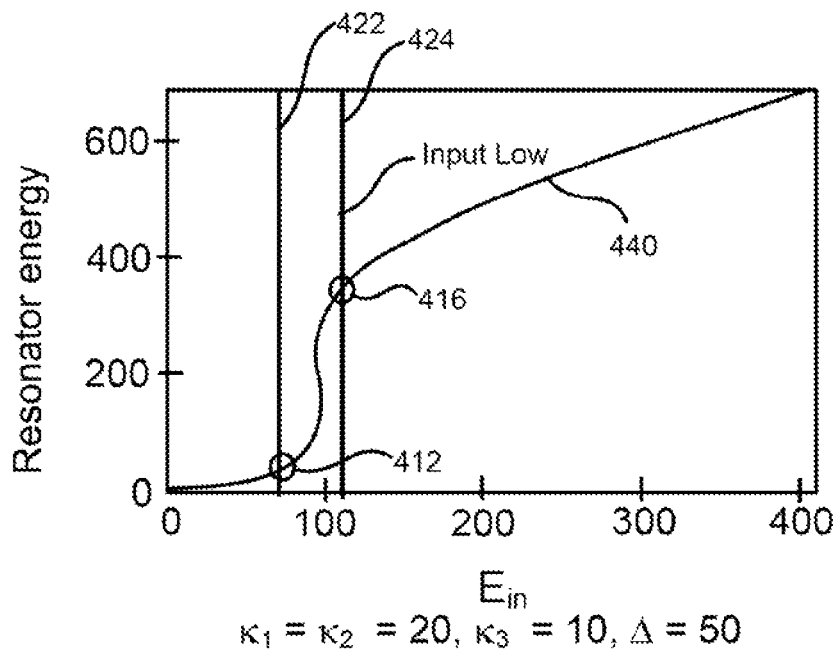
FIG. 4A depicts a graph of resonator energy in an example resonator in an inverting configuration.

FIG. 4A depicts a graph of resonator energy in an example resonator in an inverting fan-out configuration. The amplitude of the CW input may be selected such that when the logical input is low or off, the total drive from the CW input alone places the resonator 120 in a state above threshold, as indicated, for example, by drive level 424 and point 416 on curve 440 in FIG. 4A. For the case where the photonic circuit 300 is designed to perform an inverting fan-out of the logical input, where two copies of the opposite logic level of the logical input are generated, the CW input may be selected such that it is 180° out of phase with the logical input. If the logical input is on or high, because it is 180° out of phase with the CW input, it destructively interferes with the CW input and decreases the total drive to place the resonator in a state below threshold, as indicated, for example, by drive level 422 and point 412 on curve 440. Thus, the logical input is inverted, and the inverted input is coupled out of the resonator 120 to drop waveguide 125. Subsequently, the inverted input is split by 3-dB coupler 140 and carried by each of the two output waveguides 141, 142.

Figure 4B:
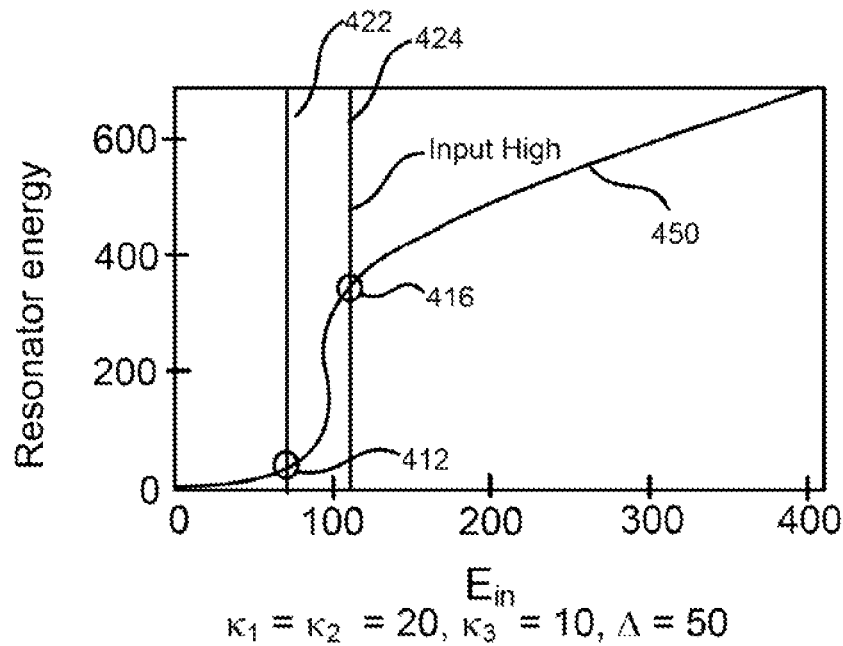
FIG. 4B depicts a graph of resonator energy in an example resonator in a non-inverting fan-out configuration.

FIG. 4B depicts a graph of resonator energy in an example resonator in a non-inverting fan-out configuration. The amplitude of the CW input may be selected such that when the logical input is low or off, the total drive from the CW input alone places the resonator in a state below threshold, as indicated, for example, by drive level 422 and point 412 on curve 450 in FIG. 4B. Thus, the CW input for the non-inverting fan-out function is selected to be less than the CW input used for the inverting fan-out function. For the case where the photonic circuit 300 is designed to perform a non-inverting fan-out of the logical input, where two copies with the same logic level as the logical input are generated, the CW input may be selected such that it is in phase with the logical input. If the logical input is on or high, because it is in phase with the CW input, it constructively interferes with the CW input and increases the total drive to place the resonator in a state above threshold, as indicated, for example, by drive level 424 and point 416 on curve 450. Thus, the logical input is not inverted, and the non-inverted input is coupled out of the resonator 120 to drop waveguide 125. Subsequently, the non-inverted input is split by 3-dB coupler 140 and carried by each of the two output waveguides 141, 142.

Figure 5:
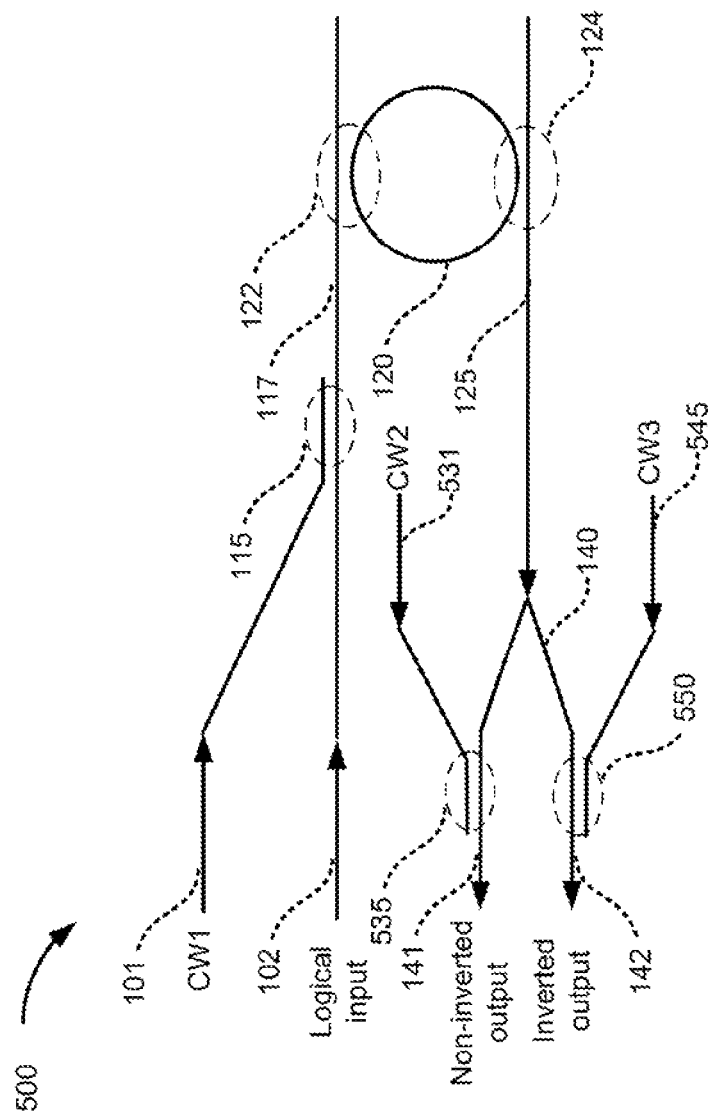
FIG. 5 depicts a schematic of an example photonic circuit that may perform a hybrid fan-out.

FIG. 5 depicts a schematic of an example photonic circuit 500 that may perform a hybrid fan-out function. With the hybrid fan-out, the photonic circuit 500 has two output waveguides 141, 142 that each carries an output signal, one output signal is the same logic level as the input signal, and the other output signal has the opposite logic level as the input signal.

The first stage of photonic circuit 500, from the inputs up to the resonator 120, is the same as the photonic circuit 300 that performs a non-inverting fan-out of the logical input. Thus, if the logical input is high for photonic circuit 500, the resonator 120 is placed in a state above threshold. The light is coupled out of the resonator 120 by the drop waveguide 125, and is split into two signals by the 3-dB coupler 140. Each of the split signals, one on waveguide 141 and the other signal on waveguide 142, may be interfered with an auxiliary CW input from waveguides 531, 545, respectively, via weak coupler 535 and 550, respectively. In the example of FIG. 5, the CW2 input may be selected to shift the non-inverted output on waveguide 141 to an appropriate level and/or change the phase of the output on waveguide 141, while the CW3 input may be selected to shift the signal split by the weak coupler 540 to an inverted output on waveguide 142. Note that the weak coupler 540 is similar to the weak couplers 115, 135 of FIG. 1 and has the same given transmission-to-reflection ratio.

Figure 6A:
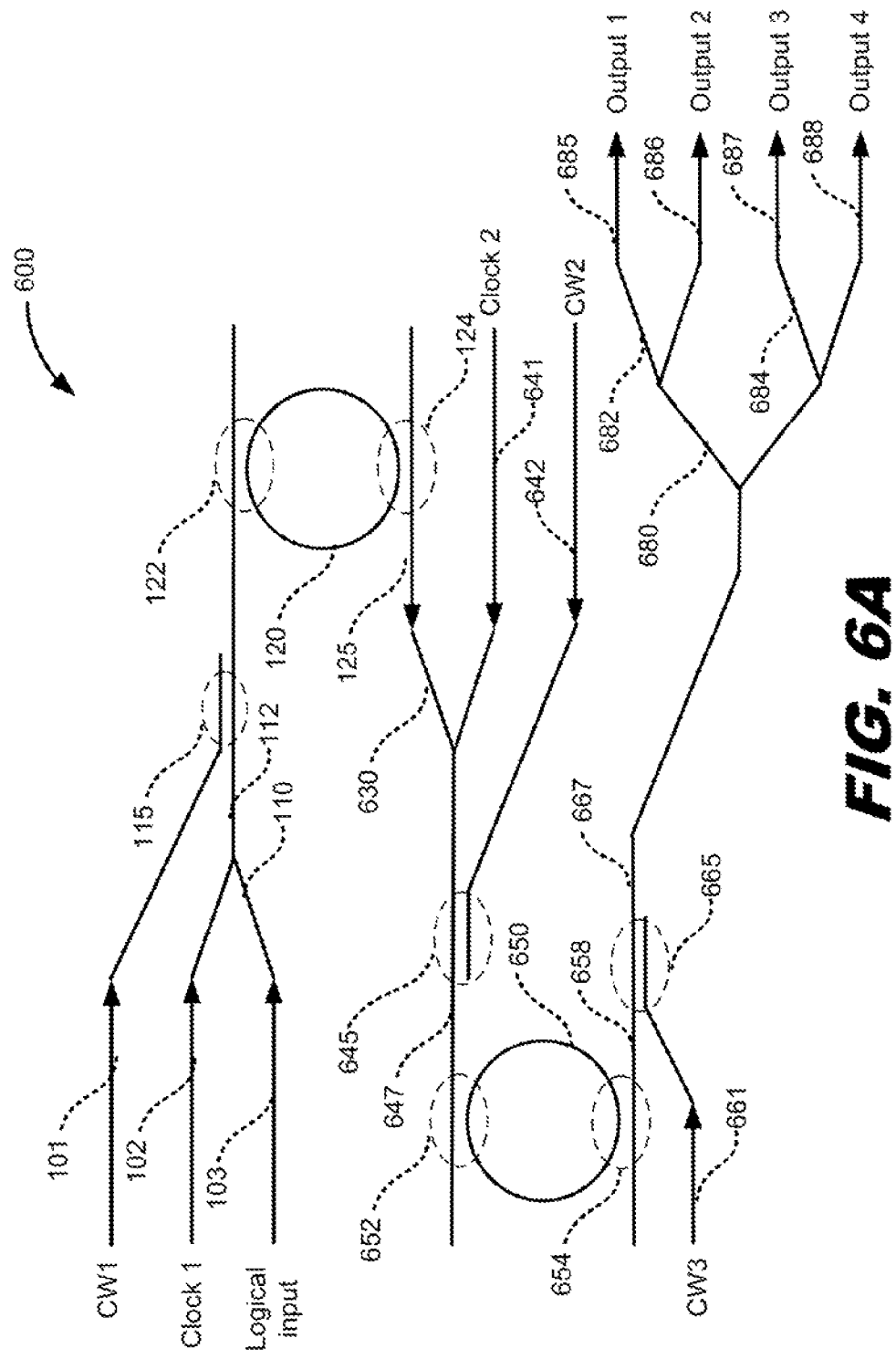
FIG. 6A depicts a schematic of an example photonic circuit that may function as a clocked flip-flop.

FIG. 6A depicts a schematic of an example photonic circuit 600 that may function as a clocked flip-flop or a latch-type circuit. Photonic circuit 600 accepts three inputs, a CW1 input at waveguide 101, a clock 1 input at waveguide 102, and a logical input at waveguide 103. The photonic circuit 600 has two resonators 120, 650. The first resonator 120 is part of a first stage of the circuit that functions as an AND gate (photonic circuit 100 of FIG. 1), where the inputs are a clock signal and a logical input signal. The CW1 input biases resonator 120 close to the switching threshold. The parameters of resonator 120 are similar to the parameters of the resonator 120 in the AND gate of FIG. 1. Thus, when both the clock signal clock 1 and the logical input are high, resonator 120 is in a state that is above threshold.

The second resonator 650 in the photonic circuit 600 has some memory associated with it such that the amount of energy in the resonator cavity is based upon both the drive field and the state of the resonator. Resonator 650 is detuned farther than resonator 120, with a detuning Δ of 75, rather than 50, while the coupling parameters of the resonators 120, 650 are the same. For the example resonators 120, 650, the cavity linewidth is the sum of the coupling strengths, $K_1+K_2+K_3$, equals 50. Thus, a detuning of 75 for resonator 650 corresponds to a detuning of 1.5 linewidths, while a detuning of 50 for resonator 120 corresponds to a detuning of one linewidth. Bistable behavior in a resonator may begin to be observed with approximately one linewidth detuning, and the width of the bistable region increases the farther the resonator is detuned. However, the farther the resonator is detuned, the more energy is needed to trigger the resonator to switch states.

Figure 6B:
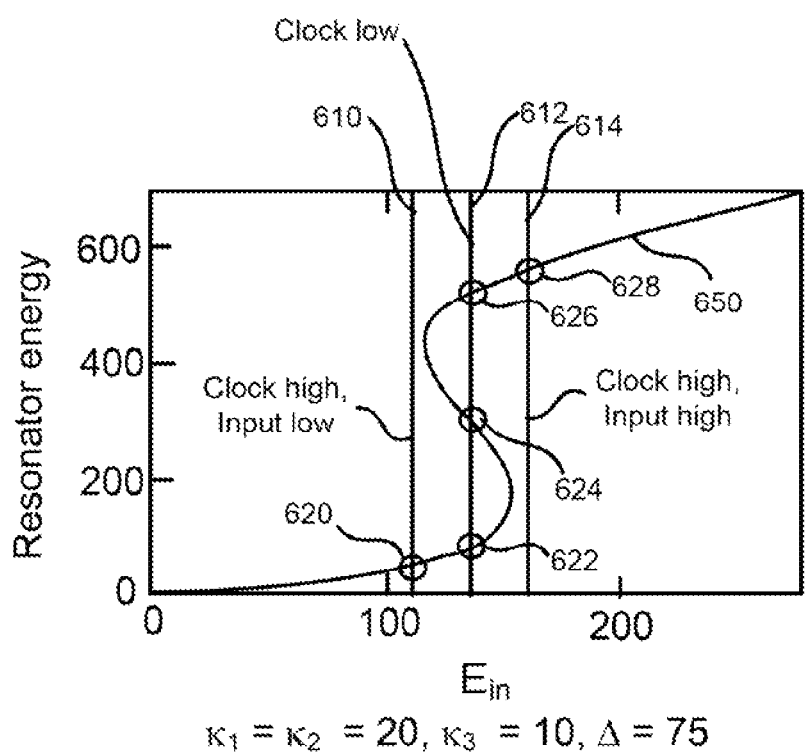
FIG. 6B depicts a graph of resonator energy in an example resonator that operates with bistable memory in a photonic circuit that functions as a clocked flip-flop.

FIG. 6B depicts a graph of resonator energy in an example resonator 650 that operates with bistable memory in a photonic circuit that functions as a clocked flip-flop. In the region where the drive field is near drive level 612, curve 640 shows multiple resonator energy states 622, 624, 626 are possible for the given drive field. The middle point 624 is an unstable state, but the other states are of interest.

For an initial weak drive field, very little energy couples into the cavity, as indicated, for example, by drive level 610 and point 820 on curve 650 in FIG. 68. The resonator 650 is in a low state. As the drive field is increased to, for example, drive level 612, the energy coupled into the cavity is indicated by point 622. With a further increase of the drive field to, for example, drive field 614, because of the resonator nonlinearity, a sufficient amount of light couples into the cavity to pull it into resonance. As a result, the amount of energy coupled into the cavity jumps up, as indicated by point 628 located on the upper branch of curve 640. This corresponds to a high state for the resonator.

From this point, if the drive field is subsequently decreased, there is sufficient energy in the cavity to maintain resonance to keep the cavity in the high state down beyond, for example, drive level 612 as indicated by point 626. In contrast, the resonator was previously in the low state at point 622 when the initial drive field was low. When the drive field is decreased further, there is eventually insufficient drive field to support the energy in the cavity, and the energy in the cavity jumps down, as indicated by, for example, point 620 located on the lower branch of curve 640, corresponding to a low state for the resonator. Thus, the circuit exhibits memory, and with a clock signal as one of the inputs, photonic circuit 600 operates as a clocked flip-flop.

Returning to FIG. 6A, light is evanescently coupled out of resonator 120 by drop waveguide 125 via coupling region 124, and the light is combined with another copy of the clock signal, clock 2, on waveguide 641 via a 3-dB coupler 630, and also combined with another CW signal CW2 on waveguide 642 via weak coupler 645. The CW2 signal may shift the level of the signal coupled out of resonator 120. The output of weak coupler 645 is on bus waveguide 647 which may couple evanescently into resonator 650 via coupling region 652. The phases of the CW1 and CW2 inputs may be selected such that when the clock signals, clock 1, and clock 2, are high, the drive field places the resonator 650 in either a high state above the upward switching threshold (for example, drive level 614 in FIG. 6B) or in a low state below the downward switching threshold (for example, drive level 610 in FIG. 68). Consequently, when the clock is high, the logical input forces resonator 650 to be either high or low, as determined by how the signals add together. When the clock is low, then independent of the state of the logical input, the resonator 650 is in its bistable regime and remembers its previous state. As a result, when the clock is high, a new state is set for resonator 650, and when the clock is low, resonator 650 retains its previous state.

Light is evanescently coupled out of resonator 650 by drop waveguide 658 via coupling region 654, and the light is combined with yet another CW signal CW3 on waveguide 661 via weak coupler 665. The output of weak coupler 665 is on waveguide 667. Because resonator 650 is farther detuned and requires more energy to switch, there is sufficient light intensity in waveguide 667 to split the signal via three 3-dB couplers 680, 682, 684 into four outputs on output waveguides 685, 686, 687, 688.

As described above, photonic circuit 600 is a high clock version of the flip-flop circuit such that when the clock is high, the logical input is loaded into the circuit, and when the dock is low, the circuit remains in its previous state. Photonic circuit 600 may also function as a low clock version of the flip-flop circuit such that when the clock is low, the logical input is loaded into the circuit, and when the clock is high, the circuit remains in its previous state. The physical circuit for the high clock version and the low clock version of the flip-flop circuit is the same, however, the amplitudes and phases of the dock inputs and the CW drive inputs are different.

A high clock version of the flip-flop circuit and a low dock version of the flip-flop circuit may be combined in series to make an optical D-type flip-flop with two stages. In the resulting D-type flip-flop, when the clock is high, the logical input is loaded into the first stage, and when the clock goes low, the logical input is transferred to the second stage which controls the output of the flip-flop. The D-type flip-flop may be used as a building block to create other types of photonic circuits, such as shift registers. Additionally, the AND gate and OR gate described above may be combined to create a photonic multiplexer, a demultiplexer and other types of photonic circuits that may perform arbitrary combinatorial and sequential logic.

Figure 6C:
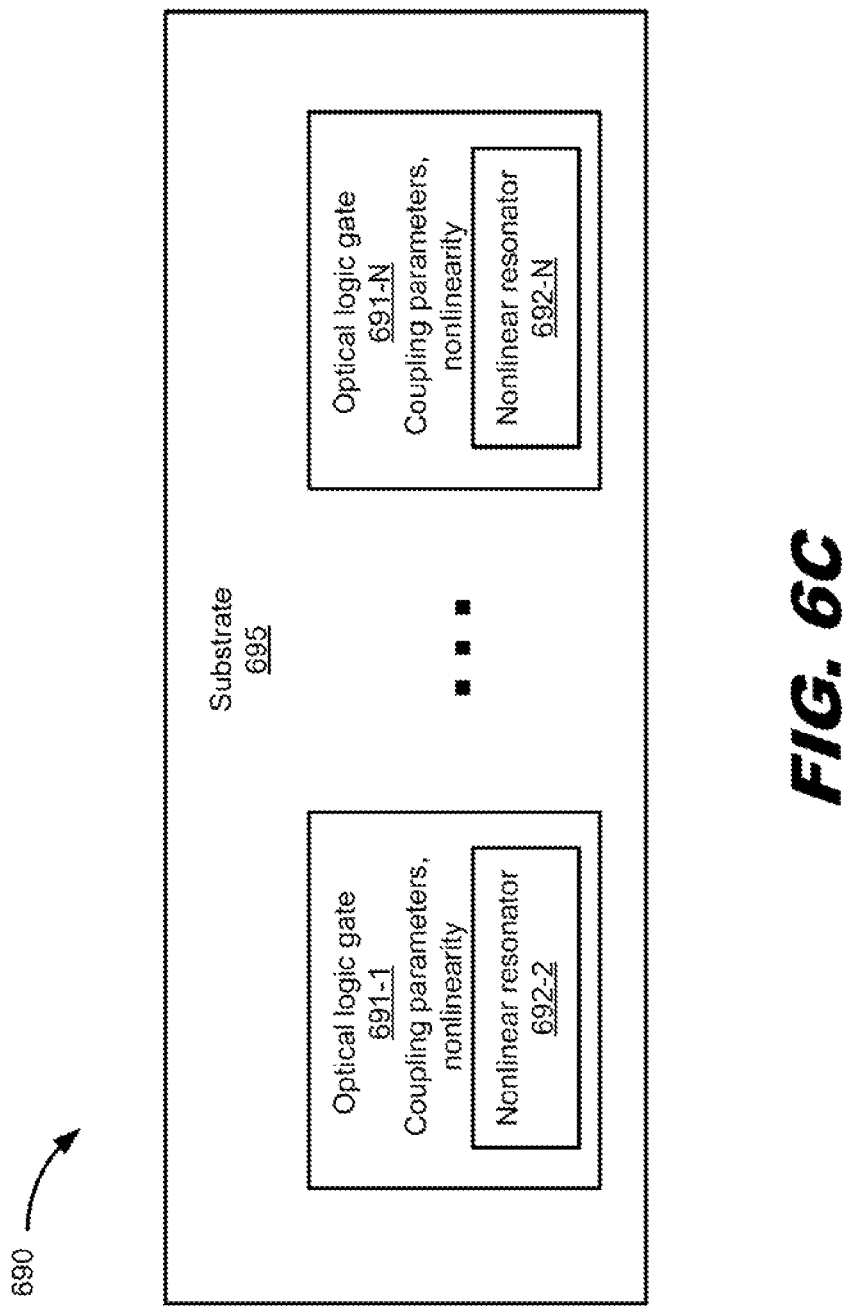
FIG. 6C depicts a block diagram of an example integrated photonic circuit including multiple optical logic gates fabricated on a substrate.

FIG. 6C depicts a block diagram of an example integrated photonic circuit 690 including multiple optical logic gates fabricated on a substrate. In summary, an integrated photonic circuit 690 may include multiple optical logic gates 691 fabricated on a substrate 695 where each of the optical logic gates 691 includes a nonlinear resonator 692 that has a dedicated continuous wave input to bias the nonlinear resonator 692 close to a switching threshold. Further, each of the optical logic gates 691 may have a same set of coupling parameters and nonlinearity as the other optical logic gates 691 in the integrated photonic circuit 690.

In some implementations, each of the optical logic gates 691 includes multiple couplers, wherein no more than two types of couplers are used in the integrated photonic circuit, and further wherein the two types of couplers consist of: a 3-dB coupler and a weak coupler with a given transmission-to-reflection ratio.

In some implementations, the integrated photonic circuit 690 does not include an interferometric loop that does not perform a logic function. And in some implementations, the continuous wave inputs and clock signal inputs to the integrated photonic circuit do not originate from on the substrate 695.

Although random variations of the resonance frequencies of resonators are a known problem, the photonic circuits described above may be tuned to ensure correct operation. In particular, more complicated photonic circuits involving multiple logic gates and/or flip-flops may benefit from tuning. There are multiple controls that may be used to tune the photonic circuits: the amplitudes of external (off-chip) inputs, the phases of external (off-chip) inputs, heaters coupled to the resonators to tune their resonant frequencies, and heaters coupled to phase tuners to tune on-chip phase shifts.

A netlist describing the ideally designed circuit may be used as a starting point. From the netlist, a set of ideal coupling matrices may be derived that describe how the resonators couple to each other, how the inputs couple to the resonators, how the resonators couple to the outputs, and how the inputs couple to the outputs.

Figure 7:
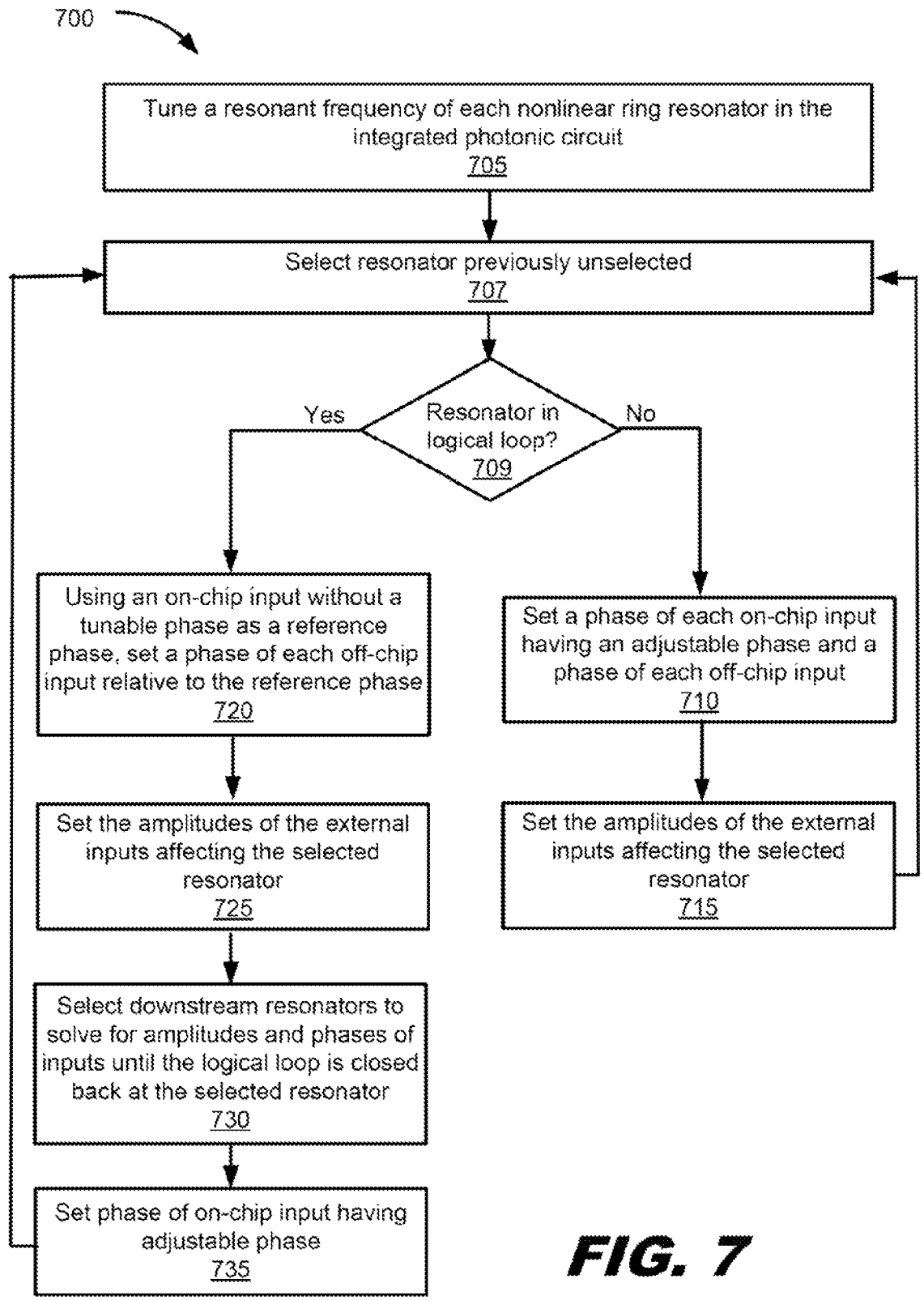
FIG. 7 depicts a flow diagram illustrating an example process of tuning a photonic circuit.

Then an algorithm may be used to tune the photonic circuit. In general, the algorithm involves tuning the resonators to their desired frequencies, setting on-chip phases, setting off-chip phases, and setting amplitudes of off-chip inputs. FIG. 7 depicts a flow diagram illustrating an example process 700 of tuning a photonic circuit based upon a netlist for the integrated photonic circuit, where the integrated photonic circuit has multiple optical logic gates, each optical logic gate includes one nonlinear ring resonator, and the multiple optical logic gates have on-chip inputs and off-chip inputs. The tuning process may be repeated as needed to ensure proper operation of the photonic circuit even as environmental conditions change, such as temperature, and coupling efficiencies of external inputs due to mechanical drift.

Figure 8:
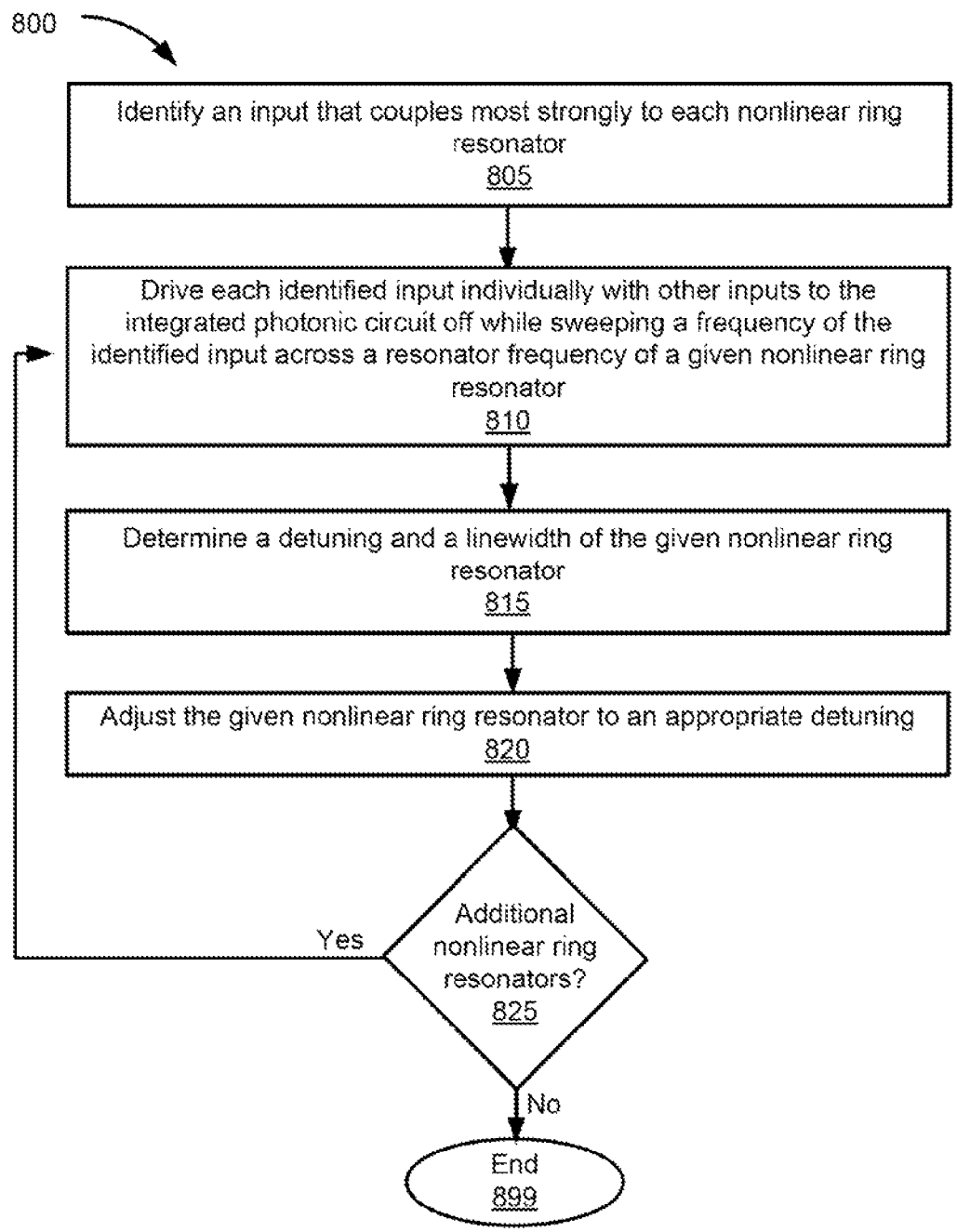
FIG. 8 depicts a flow diagram illustrating an example process of tuning a resonant frequency of each nonlinear resonator in an optical logic gate

The process begins at block 705 where a resonant frequency of each nonlinear ring resonator in the integrated photonic circuit may be tuned. When multiple resonators are fabricated, they may have different resonant frequencies because of fabrication variations. To overcome this problem, the resonators should be tuned to the right frequency by using, for example, heaters on the chip. However, before tuning the resonators, the original resonance frequency of each resonator should be established. FIG. 8 describes the details for tuning the resonant frequency.

At block 707, a resonator may be selected that was previously unselected. An appropriate amplitude and phase for each input to the selected resonator may be determined, as described below.

At decision block 709, it may be determined whether the selected resonator is in a logical loop in the photonic circuit. When a logical loop is present in the photonic circuit, it may be the case where not all of the input resonators to the selected resonator have been solved. For example, if the selected resonator performs an OR gate function, most or the tunable amplitudes and phases of the inputs may be solved, as described below; then parameters for resonators downstream of the selected resonator should be solved for until the loop is closed back at the selected resonator to solve a final phase tuner on the remaining input.

Figure 9:
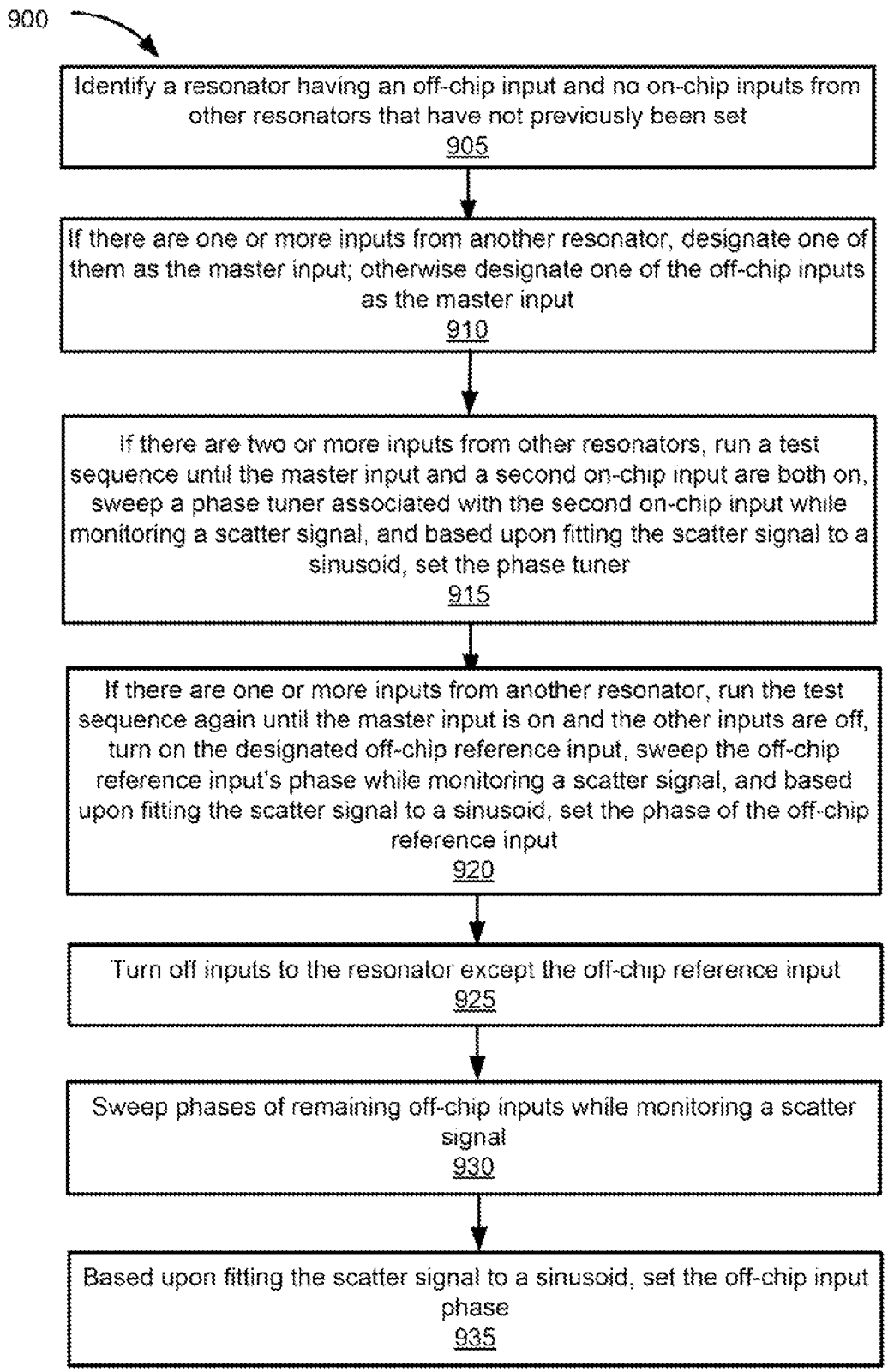
FIG. 9 depicts a flow diagram illustrating an example process of setting a phase of an on-chip input of an optical logic gate having an adjustable phase and a phase of each off-chip input

If the selected resonator is not part of a logical loop of the photonic circuit (block 709—No), at block 710, a phase of each on-chip input having an adjustable phase and a phase of each off-chip input may be set for the selected resonator. FIG. 9 describes the details for setting the phase of on-chip and off-chip inputs.

Figure 10:
FIG. 10 depicts a flow diagram illustrating an example process of setting an amplitude of an off-chip input affecting a selected resonator.

At block 715, the amplitudes of the external inputs affecting the resonator may be set. FIG. 10 describes the details for setting the amplitudes of the external, off-chip inputs. The process returns to block 707 where another resonator may be selected that was previously unselected.

Returning to decision block 709, if the selected resonator is part of a logical loop of the photonic circuit (block 709—Yes), at block 720, using an on-chip input without a tunable phase as a reference phase, a phase of each off-chip input may be set relative to the reference phase. FIG. 9 describes the details for setting the phase of off-chip inputs.

At block 725, the amplitudes of the external inputs affecting the resonator may be set. FIG. 10 describes the details for setting the amplitudes of the external inputs.

At block 730, downstream resonators may be selected to solve for the phases and amplitudes of inputs until the logical loop is closed back at the selected resonator.

At block 735, the phase of the on-chip input having an adjustable phase may be set. The phase of the on-chip input with the adjustable phase is the last parameter to be solved for the selected resonator. The process returns to block 707 where another resonator may be selected that was previously unselected.

FIG. 8 depicts a flow diagram illustrating an example process 800 of tuning a resonant frequency of each nonlinear ring resonator in an optical logic gate.

The process begins at block 805 where an input may be identified that couples most strongly to each nonlinear ring resonator. Then that input is driven. Because the elements in the photonic circuit are interconnected, if an input is driven that is close to multiple resonators, and their frequencies are swept simultaneously, the light coming out of one resonator may couple into another resonator, thus, potentially causing confusion in analyzing the effects of driving that particular input.

Then sequentially for each one of the nonlinear ring resonators, the following steps are performed. At block 810, each identified input may be driven individually, with other inputs to the integrated photonic circuit off, while sweeping a frequency of the identified input across a resonator frequency of a given nonlinear ring resonator.

At block 815, a detuning and a linewidth of the given nonlinear ring resonator may be determined. For example, the scatter signal from the resonator, or light output from a grating coupler that terminates a downstream waveguide, may be recorded while sweeping the frequency of the identified input, and a Lorentzian fit may be used to extract the detuning and linewidth of the resonator.

At block 820, the given nonlinear ring resonator may be adjusted to an appropriate detuning. For example, a heater may be used to adjust the frequency of the resonator. In some implementations, multiple iterations of heater adjustments may be performed if the heater efficiency is not known.

In some implementations, multiple resonators may be excited simultaneously for a more efficient process. However, light escaping from one resonator should not couple substantially into another resonator under test.

At decision block 825, it may be determined whether there are any additional nonlinear ring resonators that have not been adjusted. If there is an additional ring resonator (block 825—Yes), the process returns to block 810. If there are no additional ring resonators (block 825—No), the process ends at block 899.

FIG. 9 depicts a flow diagram illustrating an example process 900 of setting a phase of an on-chip input of an optical logic gate having an adjustable phase and/or a phase of each off-chip input. Each off-chip input has a tunable phase. Each resonator may have up to a single on-chip input without a tunable phase, and the phase of this on-chip input may be used as a reference phase, while the phases of the other inputs may be set relative to this reference phase. Of interest are relative phases of the inputs for the operation of a particular resonator.

The process begins at block 905 where a nonlinear ring resonator having an off-chip input and no on-chip inputs from other nonlinear ring resonators that have not previously been set may be identified.

At block 910, if there are one or more inputs from another resonator, one of the inputs may be designated as the master input. Otherwise, one of the off-chip inputs may be designated as the master input.

At block 915, if there are two or more inputs from other resonators, a test sequence may be run until the master input and a second on-chip input are both on. The test sequence is a predetermined input signal sequence that exercises the logic levels to be used when the photonic circuit is operating. A phase tuner associated with the second on-chip input may be swept while monitoring a scatter signal from the resonator. To obtain an interference signal, the two inputs should be driven simultaneously, the reference input whose phase is kept constant, and the input being solved whose phase is swept to generate the sinusoid. Based upon fitting the scatter signal to a sinusoid, the phase tuner may be set.

At block 920, if there are one or more inputs from another resonator, the test sequence may be run again until the master input is on and the other inputs are off. Then, a designated off-chip reference input may be turned on, and its phase may be swept while monitoring a scatter signal. Based upon fitting the scatter signal to a sinusoid, the phase of the off-chip reference input may be set.

At block 925, the inputs to the resonator except the off-chip reference input may be turned off.

At block 930, the phases of the remaining off-chip inputs may be swept while monitoring a scatter signal. For example, a spatial light modulator, as described above, may be used to sweep the phase.

At block 935, based upon fitting the scatter signal to a sinusoid, the off-chip input phase may be set. For example, the deviation of the fitted phase from a theoretical phase may be used to set the off-chip input phase. Setting the off-chip input phase may compensate for on-chip, off-chip, or input grating phase shifts.

FIG. 10 depicts a flow diagram illustrating an example process 1000 of setting an amplitude of an off-chip, external input of a given resonator in a photonic circuit. Off-chip inputs may include a CW input used to bias the resonator to a switching threshold, clock inputs, and CW inputs combined with an immediately upstream resonator's output.

The process begins at block 1005 where a given external input to a given resonator may be turned on and other inputs to the integrated photonic circuit may be turned off.

At block 1010, an amplitude of the given external input may be swept across a switching threshold of the given resonator. While sweeping the input, scattering of light from the resonator may be monitored. The monitored light scattering is a signal that is proportional to the resonant energy in the cavity of the resonator. For example, in the case of Kerr or thermal nonlinearities, a cubic function may be fit to the drive amplitude as a function of scatter intensity. Then the drive amplitude may be set based on the ratio between the fitted and ideal field amplitude at the inflection point of the cubic function. Additional corrections may also be estimated based on the expected field amplitudes from other resonators.

At block 1015, based on scattering from the given resonator, the amplitude of the given input may be set. For example, light scattered vertically out of the resonator may be collected. The scattering may occur due to roughness of the sidewalls or the top and bottom surfaces of the resonator. In some cases, light scattering may also occur from the resonator material if it is polycrystalline. Additionally or alternatively, shallow grooves may be created on top of the ring resonator to enhance the scattered signal.

Alternatively, the amplitude of the given input may be set based upon light coupled out via a waveguide from the given one of the nonlinear ring resonators. For example, the light may be probed by coupling it out into free space with a grating coupler, or by using an on-chip photodetector.

In some implementations, the off-chip input amplitudes may be determined without solving any of the tunable phases. However, if both amplitudes and phases of inputs are solved one resonator at a time, corrections may be made to the off-chip drive amplitudes to compensate for on-chip input amplitudes from upstream components being higher or lower than expected. The tunable photonic circuit approach described above may enable all-optical digital logic using integrated semiconductor platforms, such as amorphous or crystalline silicon. In particular, all-optical logic may be useful when the inputs and outputs are optical, and simple logic is to be performed without incurring energy or latency costs associated with converting the optical signals to electrical signals and back to optical signals again.

Not all of the steps, or features presented above are used in each implementation of the presented techniques.

As used in the specification and claims herein, the singular forms "a," "an," and "the" include plural referents unless the context clearly dictates otherwise.

What is claimed is:

1. A method of tuning an integrated photonic circuit based upon a netlist for the integrated photonic circuit, wherein the integrated photonic circuit has multiple optical logic gates, each optical logic gate includes one nonlinear ring resonator, and the multiple optical logic gates have on-chip inputs and off-chip inputs, the method comprising:

tuning a resonant frequency of each nonlinear ring resonator in the integrated photonic circuit;

setting a phase of each on-chip input having an adjustable phase and a phase of each off-chip input;

setting an amplitude of each continuous wave input used to bias each nonlinear ring resonator in the integrated photonic circuit to a switching threshold.

2. The method of claim 1, wherein tuning a resonant frequency of each nonlinear ring resonator comprises:

identifying an input that couples most strongly to each nonlinear ring resonator;

sequentially for each one of the nonlinear ring resonators:

driving each identified input individually, with other inputs to the integrated photonic circuit off, while sweeping a frequency of the identified input across a resonator frequency of a given nonlinear ring resonator;

determining a detuning and a linewidth of the given nonlinear ring resonator;

adjusting the given nonlinear ring resonator to an appropriate detuning.

3. The method of claim 1, wherein setting a phase of an on-chip input having an adjustable phase and a phase of each off-chip input for a given resonator comprises:

identifying a nonlinear ring resonator having an off-chip input and no on-chip inputs from other nonlinear ring resonators that have not previously been set;

when there are one or more inputs from another resonator, designating one of them as a master input, and otherwise designating one of the off-chip inputs as the master input;

when there are two or more inputs from other resonators, a test sequence is run until the master input and a second on-chip input are both on, a phase tuner associated with the second on-chip input is swept while monitoring a scatter signal, and based upon fitting the scatter signal to a sinusoid, the phase tuner is set;

when there are one or more inputs from another resonator, the test sequence is run again until the master input is on and the other inputs are off, a designated off-chip reference input is turned on, and the off-chip reference input's phase is swept while monitoring a scatter signal, and based upon fitting the scatter signal to a sinusoid, the phase of the off-chip reference input is set;

turning off inputs to the resonator except the off-chip reference input;

sweeping phases of remaining off-chip inputs while monitoring a scatter signal; and based upon fitting the scatter signal to a sinusoid, setting the off-chip input phase.

4. The method of claim 1, wherein setting an amplitude of an external input of a given resonator in the integrated photonic circuit comprises:

turning on a given external input to the given resonator and turning off other inputs to the integrated photonic circuit;

sweeping an amplitude of the given external input across a switching threshold of the given resonator;

based on scattering or light coupled out via a waveguide from the given resonator, setting the amplitude of the given external input.

* * * * *